US011048660B2

(12) United States Patent
Poitrey

(10) Patent No.: US 11,048,660 B2
(45) Date of Patent: Jun. 29, 2021

(54) ACCELERATION SYSTEM FOR FACILITATING PROCESSING OF API CALLS

(71) Applicant: NETFLIX, Inc., Los Gatos, CA (US)

(72) Inventor: Olivier Jean Poitrey, Sunnyvale, CA (US)

(73) Assignee: NETFLIX, INC., Los Gatos, CA (US)

( * ) Notice: Subject to any disclaimer, the term of this patent is extended or adjusted under 35 U.S.C. 154(b) by 148 days.

(21) Appl. No.: 15/628,509

(22) Filed: Jun. 20, 2017

(65) Prior Publication Data
US 2018/0365190 A1 Dec. 20, 2018

(51) Int. Cl.
| H04L 29/08 | (2006.01) |
| G06F 15/173 | (2006.01) |
| G06F 9/38 | (2018.01) |

(52) U.S. Cl.
CPC ...... *G06F 15/17312* (2013.01); *G06F 9/3885* (2013.01); *H04L 67/101* (2013.01); *H04L 67/1004* (2013.01); *G06F 2209/549* (2013.01)

(58) Field of Classification Search
None
See application file for complete search history.

(56) References Cited

U.S. PATENT DOCUMENTS

| 6,185,598 | B1 | 2/2001 | Farber et al. | |
| 7,274,658 | B2 * | 9/2007 | Bornstein | H04L 29/06 370/227 |
| 2002/0163882 | A1 | 11/2002 | Bornstein et al. | |
| 2009/0235283 | A1 * | 9/2009 | Kim | G06F 9/44 719/328 |
| 2011/0264905 | A1 * | 10/2011 | Ovsiannikov | H04L 29/08792 713/151 |
| 2015/0163117 | A1 * | 6/2015 | Lambeth | H04L 47/2441 709/224 |
| 2015/0365301 | A1 * | 12/2015 | Chatterjee | H04L 41/5054 709/226 |
| 2019/0057016 | A1 * | 2/2019 | Pasquini | G06F 11/3616 |
| 2019/0073303 | A1 * | 3/2019 | Marshall | G06F 12/0811 |
| 2019/0258407 | A1 * | 8/2019 | Buzzard | G06F 3/0617 |

FOREIGN PATENT DOCUMENTS

KR 10-2017-0059465 A 5/2017

OTHER PUBLICATIONS

International Search Report for application No. PCT/US2018/038176 dated Sep. 18, 2018.

* cited by examiner

*Primary Examiner* — Angela Nguyen
(74) *Attorney, Agent, or Firm* — Artegis Law Group, LLP

(57) ABSTRACT

One embodiment includes acceleration systems that operate as intermediaries between the API processing system and the clients to reduce API call roundtrip latencies. The acceleration systems are a network of interconnected systems that are distributed across the globe. A given acceleration system establishes a network connection with a given client and receives a request for processing an API call over the connection. The programming function associated with the API call is configured in the API processing system. The acceleration system facilitates the processing of the API call over an established connection with the API processing system.

21 Claims, 5 Drawing Sheets

ACCELERATION SYSTEM FOR FACILITATING PROCESSING OF API CALLS

BACKGROUND OF THE INVENTION

Field of the Invention

The present invention relates generally to cloud-based computing and, more specifically, to an acceleration system for facilitating the processing of application programming interface (API) calls.

Description of the Related Art

Many Internet-based services are hosted on cloud-based systems. The cloud-based systems typically include geographically distributed servers, such that a client of a service hosted on the cloud-based system is routed to the nearest server of the cloud-based system. In some cases, even the nearest server in the cloud-based system is a sizeable distance from the client.

Generally, the farther the client is from the server to which it is routed, the slower the communication round-trips between the server and the client and the higher the communication latency. Further, to establish a communication connection with the server, the client must perform several communication handshakes, such as a transfer control protocol (TCP) handshake. Further, the client engages in a transport layer security (TLS) handshake with the server to establish a secure communication session. The TLS handshake typically takes two roundtrips between the client and server.

The farther the client is from the server to which it is routed, the longer the time it takes to perform these handshakes and, thus, to establish a connection between the client and the server. Thus, in cases where the client is at a sizeable distance from the client from the server, accessing functionality of the Internet-based service through the cloud-based system may be very slow and lead to an undesirable user experience.

SUMMARY OF THE INVENTION

One embodiment of the present invention sets forth a method that includes a method for steering a client device to a suitable API edge gateway. The method includes receiving, from a client device, a steering request associated with an application programming interface (API) call. The method also includes, in response to receiving the steering request, selecting, based on a reachability selection criteria, an acceleration system that operates as an intermediary between the client device and an API processing system while enabling the API call to be processed, and routing the client device to the acceleration system.

One advantage of the disclosed method is that the round trip time for processing the API call is reduced when the acceleration system operates as the intermediary between the client device and the API processing system. In particular, any round trip times needed to establish the communication connection between the client device and the acceleration system are shorter relative to if the connection needed to be established between the client device and the API processing system.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
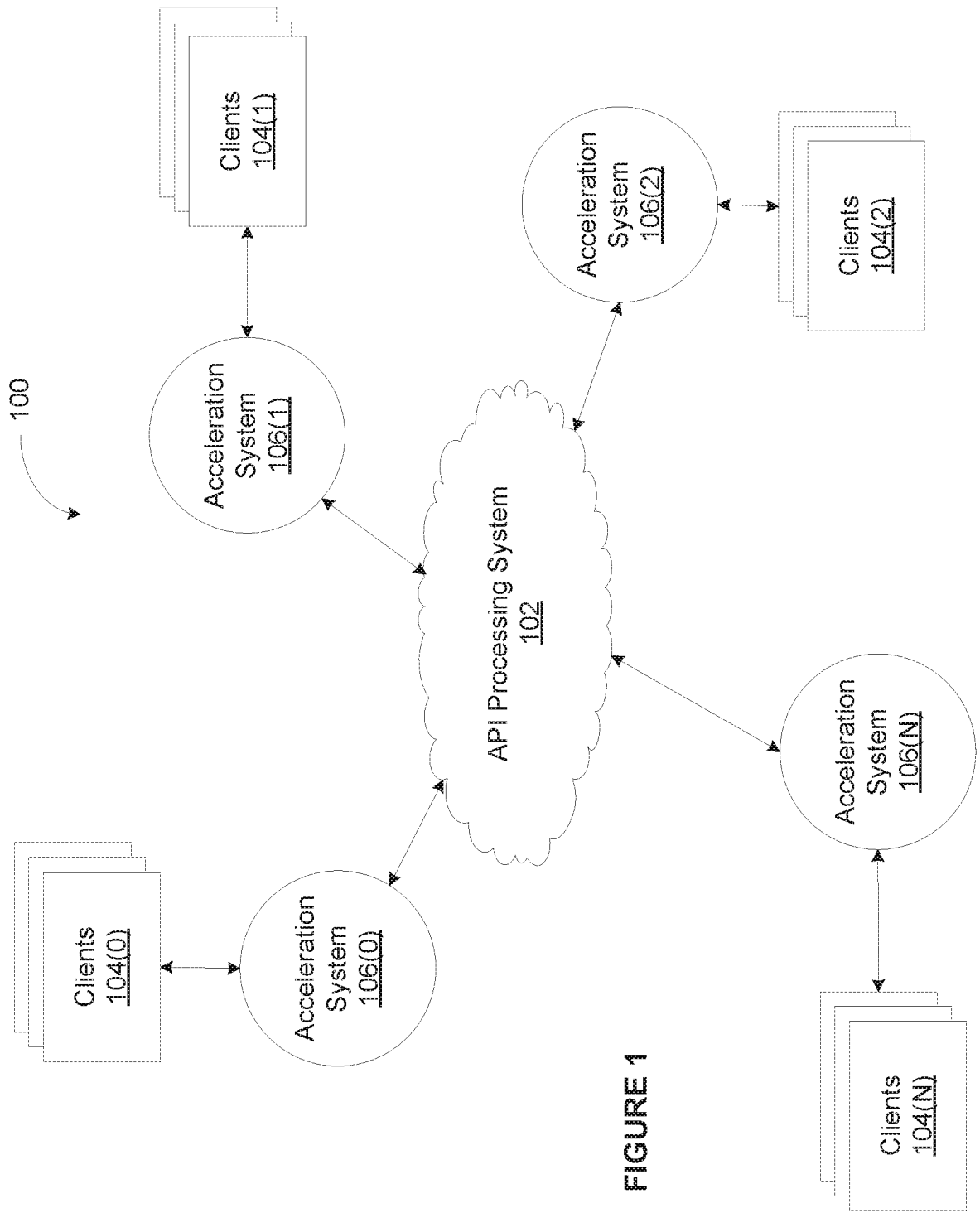
FIG. 1 illustrates a system environment configured to implement one or more aspects of the invention.

FIG. 1 illustrates a system environment 100 configured to implement one or more aspects of the invention. As shown, the system environment 100 includes an API processing system 102, clients 104(0)-104(N) (collectively referred to as "clients 104" and individually referred to as "client 104"), acceleration systems 106(0)-106(N) (collectively referred to as "acceleration systems 106" and individually referred to as "acceleration system 106").

The API processing system 102, the acceleration systems 104, and the clients 102 communicate over a communications network (not shown). The communications network includes a plurality of network communications systems, such as routers and switches, configured to facilitate data communication. Persons skilled in the art will recognize that many technically feasible techniques exist for building the communications network, including technologies practiced in deploying the well-known Internet communications network.

The API processing system 102 includes a network of interconnected nodes that are distributed across the globe and receive, transmit, process, and/or store data associated with system environment 100. The interconnected nodes may include any suitable combination of software, firmware, and hardware to perform these desired functions. In particular, the API processing system 102 includes multiple computing devices that may be co-located or physically distributed from one another. For example, these computing devices could include one or more general-purpose PCs, Macintoshes, workstations, Linux-based computers, server computers, one or more server pools, or any other suitable devices. The computing devices store and execute one or more programs that are remotely accessible via corresponding application programming interfaces (APIs). In some embodiments, the API processing system 102 provides computing resources to external entities at a charge. Such an entity configures portions of the API processing system 102, and clients of those entities access the configured portions of the API processing system 102 to perform operations associated with the entity.

The clients 104 include one or more computer systems at one or more physical locations. Each computer system may include any appropriate input devices (such as a keypad, touch screen, mouse, or other device that can accept information), output devices, mass storage media, or other suitable components for receiving, processing, storing, and communicating data. Both the input device and output device may include fixed or removable storage media such as a magnetic computer disk, CD-ROM. Each computer system may include a personal computer, workstation, network computer, kiosk, wireless data port, tablet computer, one or more processors within these or other devices, or any other suitable processing device.

Each client 104 may comprise a computer system, a set top box, a mobile device such as a mobile phone, or any other technically feasible computing platform that has network connectivity. In one embodiment, a client 102 is coupled to or includes a display device and speaker device for presenting video content, and generating acoustic output, respectively. Each client 104 includes computer hardware and/or computer software that relies on the API processing system 102 for certain operations.

In particular, a client 104 executes one or more cloud-based applications that communicate with the API processing system 102 over the communications network to perform various operations. In one embodiment, a cloud-based application operates by issuing requests to a portion of the API processing system 102 that is configured with the processing infrastructure needed to process the request. In response to receiving the request, the API processing system 102 processes the request and generates output data that is transmitted back to the cloud-based application. This roundtrip between the cloud-based application, executing on a client 104, and a remote server is referred to as the API call roundtrip. In general, the farther the client 104 is from the portion of the API processing system 102, the higher the latency of the API call round trip. Further, the higher the congestion on the portion of the API processing system 102 processing the request, the higher the latency of the API call round trip The acceleration systems 106 operate as an intermediary between the API processing system 102 and the clients 104 to reduce the API call roundtrip latencies. The acceleration systems 106 includes a network of interconnected systems that are distributed across the globe and that each operates as an intermediary between the clients 104 and the API processing system 102. A given acceleration system 106 establishes a network connection with a given client 104 and receives a request for processing an API call over the connection. The programming function associated with the API call is configured in the API processing system 102. The acceleration system 106 facilitates the processing of the API call over a connection with the API processing system 102.

When an acceleration system 106 operates as an intermediary between the API processing system 102 and the client 104, the API call round trip time is reduced for at least two reasons. First, in some embodiments, the acceleration system 106 is generally physically closer to the client 104 relative to the API processing system 102. Thus, any round trip times needed to establish the communication connection between the client 104 and the acceleration system 106 are shorter relative to if the connection needed to be established between the client 104 and the API processing system 102. Second, in some embodiments, due the acceleration system 106 having a large volume of requests originating from multiple clients 104, the acceleration system 106 has a consistent and established connection with the API processing system 102. Thus, a connection with the API processing system 102 need not be established for each API call.

Figure 2:
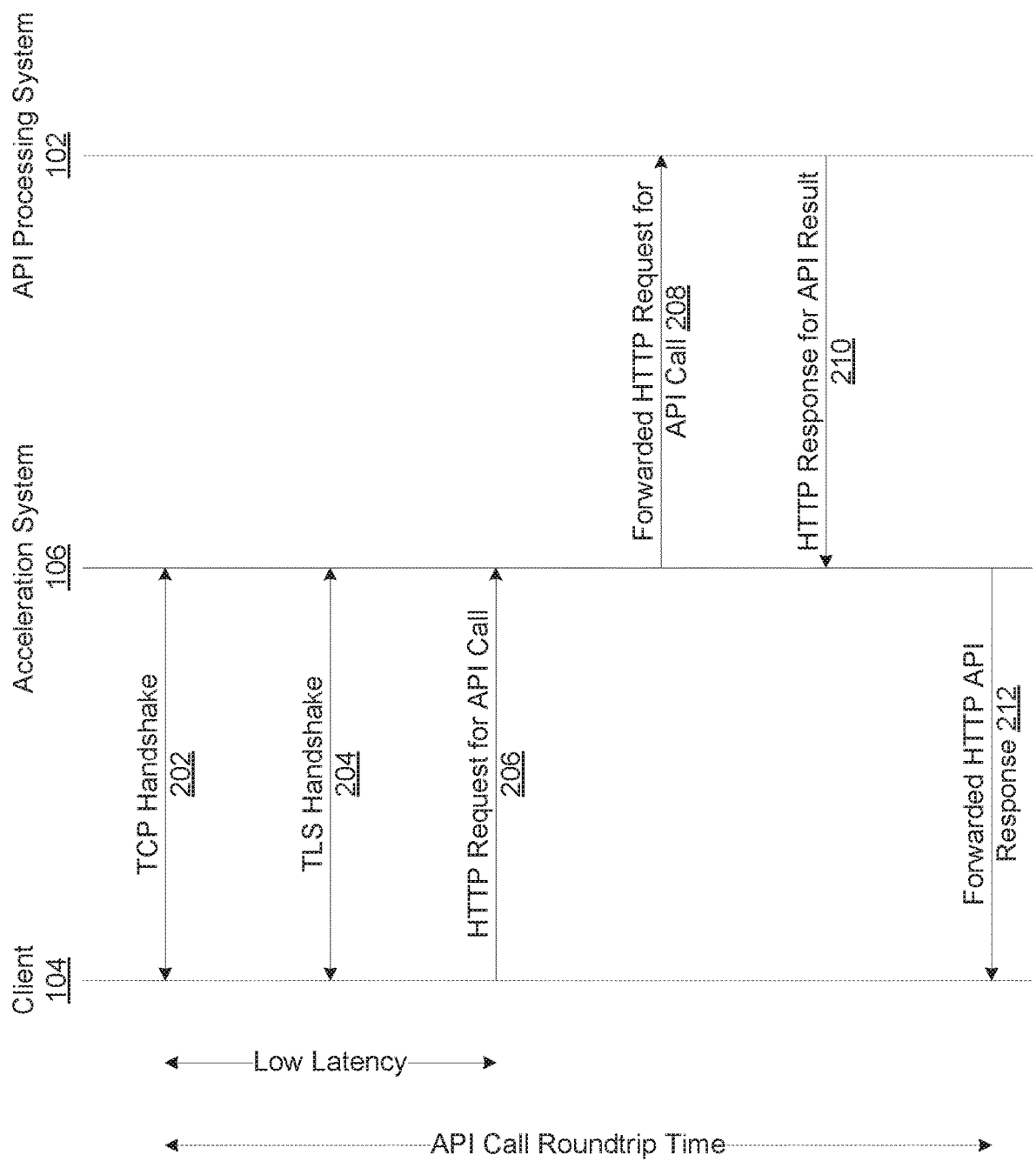
FIG. 2 is an interaction diagram illustrating the interactions between the components of FIG. 1, according to one embodiment of the invention.

FIG. 2 is an interaction diagram illustrating interactions between the components of FIG. 1, according to one embodiment of the invention. In particular, the client 104 and the acceleration system 106 perform 202 a transmission control protocol (TCP) handshake. The TCP handshake is the mechanism by which the client 104 and the acceleration system 106 negotiate and start a TCP communication session for communicating with one another. The client 104 and the acceleration system 106 perform 204 a transport layer security (TLS) handshake. The TLS handshake is the mechanism by which the client 104 and the acceleration system 106 exchange the security keys needed to establish a secure communication session.

Once the secure communication session is established, the client 104 transmits 206 over the established connection a hypertext transfer protocol (HTTP) request for processing a given API call. The acceleration system 106 forwards 208 the HTTP request for processing the API call to the API processing system 102. In one embodiment, the acceleration system 106 manages multiple HTTP requests that are in turn forwarded to the API processing system 102. To manage the transmission and/or the ordering of these requests, the acceleration system 106 multiplexes those requests using HTTP/2. The API processing system 102 processes the API call and transmits 210 the result of the processing in an HTTP response to the acceleration system 106. The acceleration system 106 forwards 212 the HTTP response to the client 104.

The duration between when the TCP handshake starts and when the HTTP response is received by the client 104 is the API call roundtrip time. In one embodiment, this API call roundtrip time is lower than an implementation where the client 104 directly communicates with the API processing system 102. The API call roundtrip time is lower in part because of the low latency of the communications between the client 104 and the acceleration system 106 when performing the TCP handshake and the TLS handshake.

Figure 3:
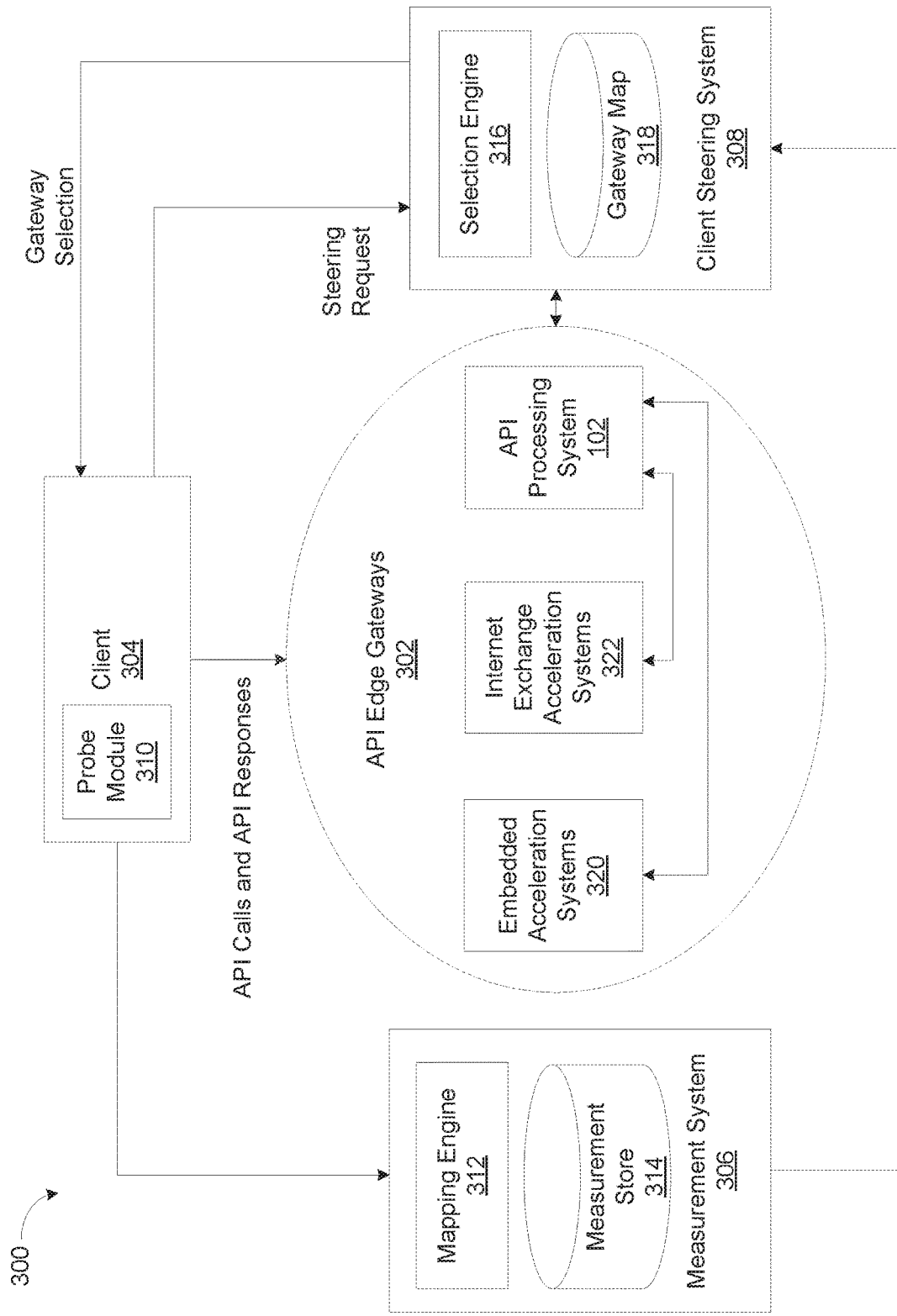
FIG. 3 illustrates a steering system environment configured to implement one or more aspects of the invention.

FIG. 3 illustrates a steering system environment 300 configured to implement one or more aspects of the invention. The system environment 300 includes API edge gateways 302, a client 304, a measurement system 306, and a client steering system 308.

The API edge gateways 302 include different systems that can be accessed by the client 304 for processing a given API call. In the illustrated embodiment, the API edge gateways 302 include embedded acceleration systems 320 (individually referred to as "acceleration system 320"), Internet exchange (IX) acceleration systems 318 (individually referred to as "acceleration system 322"), and the API processing system 102 of FIG. 1.

The embedded acceleration systems 320 and the IX acceleration systems 322 include many geographically distributed instances of the acceleration system 106 and facilitate the processing of API calls in conjunction with the API processing system 102. Each of the embedded acceleration systems 320 is an acceleration system 106 that is embedded within a network associated with the ISP. In one embodiment, because the acceleration system 320 is internal to the ISP, the acceleration system 320 is accessible only by clients that are associated with and/or subscribe to the ISP. Each of the IX acceleration systems 322 is an acceleration system 106 that operates within or in association with an Internet exchange point and independent of an ISP. An Internet exchange point is a physical infrastructure through which ISPs and content delivery networks (CDNs) exchange Internet traffic.

The measurement system 306 monitors interactions between clients, e.g., client 304, and the API edge gateways 302 to measure latencies between different clients or groups of clients and different API edge gateways 302. The steering system 308 steers clients, e.g., client 304, to one of the API edge gateways 302 (i.e., one of the embedded acceleration systems 320, one of the IX acceleration systems 322, or the API processing system 102) for processing API calls based on the latencies measured by the measurement system. In such a manner, an API call from a client is processed by an API edge gateway 302 that, based on past latency measurements, may be associated with the lowest latency with respect to that client.

The following discussion provides details regarding how the measurement system 306 measures latencies between the client 304 and the API edge gateways 302. The discussion also provides details regarding how the client steering system 308 uses the measured latencies to steer the client 304 to an appropriate API edge gateway 302.

The client 304 includes a probe module 310 to enable the measurement system 306 to monitor the interactions between the client 304 and the API edge gateways 302. The probe module 310 queries a monitoring API endpoint to request a list of unique resource locators (URLs) associated with different API edge gateways 302 that are to be monitored. Each URL in the list has a given name that corresponds to the API edge gateway 302 associated with the URL. The response from the monitoring API endpoint includes the list of URLs as well as a set of parameters that control the measurement process. These parameters include a wait parameter that specifies a length of time that the probe module 310 should wait after completing the given measurement process to start another measurement process. The parameters also include a pulse parameter that specifies a number of requests to perform for each provided URL during the measurement process, a pulse interval parameter that specifies a length of time to wait between each request to the provided URL, and a pulse timeout parameter that specifies a maximum length of time to wait for a request to the provided URL to complete. In one embodiment, a URL provided in the list returned to the probe module 310 is associated with an expiration.

During the measurement process, the probe module 310 collects a set of measurement data associated with each request to a URL provided by the monitoring API endpoint. The measurement data includes, but is not limited to, a total duration of a request, a length of time taken to establish the TCP connection, a length of time taken to perform the TLS handshake, a length of time for resolving the hostname associated with the URL, the time to first byte, i.e., the time between the start of a request and the first byte received in response to a request, the HTTP status code associated with the response to a request, and the payload size received in response to a request. In addition to the parameters, the probe module 310 collects any intermediary systems between the API endpoint associated with the URL and the client 304. These intermediary systems include the acceleration systems 320 and 322 or an API hosting service. The probe module 310 transmits the collected measurement data associated with each request issued during a measurement process to the measurement system 306.

In one embodiment, the client 304 is configured with HTTP keep-alive such that, after a connection is established, subsequent requests to the same URL can reuse the connection. In such an embodiment, the measurement parameters for subsequent requests may be shorter in length than the first request where the connection is first established. In one embodiment, the probe module 310 resets established connections between different requests within the same measurement process and/or across two measurement processes.

The measurement system 306 includes a mapping engine 312 and a measurement store 314. The measurement system 306 stores the measurement data received from different clients, including client 304, in the measurement store 314 for further processing. The mapping engine 312 generates a mapping between a set of clients and one of the API edge gateways 302 (i.e., one of the embedded acceleration systems 320, one of the IX acceleration systems 322, or the API processing system 102). A given API edge gateway 302 is best suited to process API calls issued by the set of clients based a latency criteria and a reachability criteria.

With respect to the latency criteria, the mapping engine 312 accounts for API call roundtrip times (also referred to as "latency") captured by the measurement data stored in the measurement store 314. In one embodiment, the latency represents a total time taken to complete a request or a set of requests associated with a given URL during the measurement process. The represented time starts when a connection between a client and the API edge gateway 302 associated with the URL was initiated and ends when a response associated with the API call was received by the client. In one embodiment, for a given set of clients, the mapping engine 312 scores each of a set of API edge gateways 302 based on the measurement data stored in the measurement store 314. The score of a given API edge gateway 302 may be based on a median latency for processing API calls issued by the given client or given set of clients.

With respect to the reachability criteria, the mapping engine 312 maps a set of clients to only those acceleration systems 320 or 322 that are accessible by those clients. As discussed above, because an embedded acceleration system 320 is internal to an ISP, the embedded acceleration system 320 is accessible only by clients that are associated with and/or subscribe to the ISP. Therefore, the mapping engine 312 maps a set of clients to a given embedded acceleration system 320 only when the set of clients is associated with and/or subscribes to the ISP within which that embedded acceleration system 320 is embedded. Similarly, because an IX acceleration system 322 is internal to an Internet exchange point, the IX acceleration system 322 is accessible only by clients that can access that Internet exchange point. Therefore, the mapping engine 312 maps a set of clients to a given IX acceleration system 322 only when the client 304 can access the Internet exchange point that includes that IX acceleration system 322.

The mapping engine 312 generates a gateway map based on the determined mappings between sets of clients and the individual API edge gateways 302 best suited to process API calls issued by those sets of clients. The mapping engine 312 transmits the gateway map to the client steering system 308 for performing client steering in response to steering requests from the client. The gateway map stores key-gateway pairings, where a key in a key-gateway pairing identifies one or more clients and the gateway in the key-gateway pairing identifies the API edge gateway 302 best suited to process API calls issued by that set of clients. In one embodiment, the key in a key-gateway pairing is an IP address associated with a given client. The IP address associated with a given client is determined based on the measurement data stored in the measurement store 314.

In some cases, steering requests received by the client steering system 308 do not include the IP address of a client but instead include the IP address of a resolver associated with the ISP through which the client accesses the Internet. For the client steering system 308 to be able to use the gateway map in such cases, the key in a key-gateway pairing should be a resolver IP associated with a group of clients that access the Internet through the ISP associated with the resolver. Since the measurement data received from different clients specifies the client IP address and not the resolver IP address, the mapping engine 312 implements a correlation technique to associate the measurement data and the latencies computed therefrom with a resolver IP address.

Figure 4:
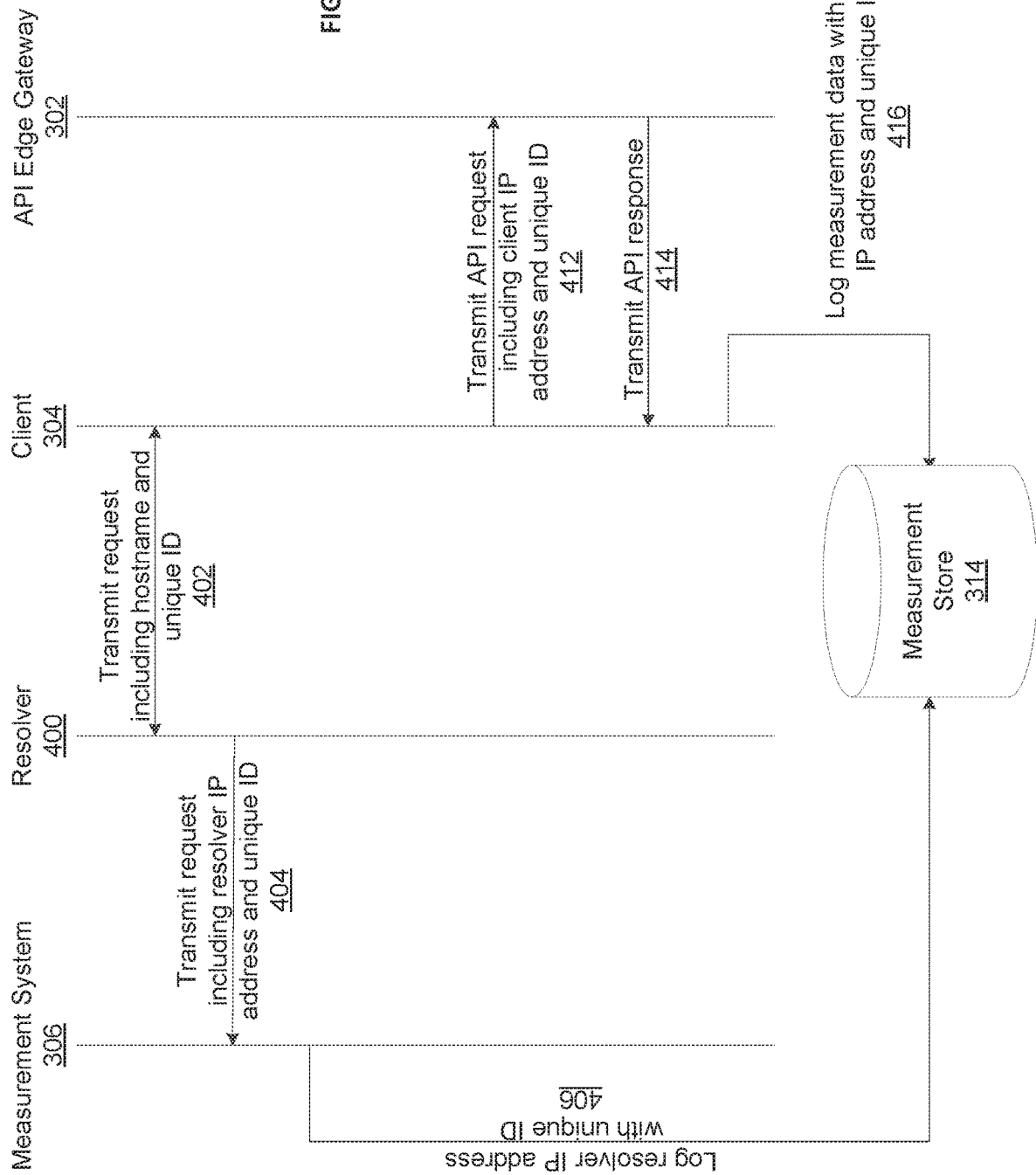
FIG. 4 is an interaction diagram illustrating the interactions between the components of FIG. 3 using a unique identifier, according to one embodiment of the invention.

FIG. 4 is an interaction diagram illustrating the interactions between the components of FIG. 3 using a unique identifier, according to one embodiment of the invention. In particular, the client 304 transmits 402 to a resolver 400 a resolution request including a hostname and a unique identifier associated with the client 304. The resolver 400 is associated with the ISP through which the client 304 accesses the Internet. The resolver 400 resolves the hostname and, consequently, redirects 404 the client 304 to the measurement system 306. In the redirection process, the request to the measurement system 306 includes the IP address of the resolver. The measurement system 306 logs 406 the relationship between the resolver IP address and the unique identifier in the measurement store 314.

The client 304 transmits 412 an API call request to an API edge gateway 302. The API call request includes the unique identifier and a client IP address associated with the client 304 that is different than the resolver IP address. The API edge gateway 302 processes or facilitates the processing of the API call, as the case may be, and transmits 414 an API response to the client 304. The API edge gateway 302 also logs 416 measurement data associated with the processing of the API call in the measurement store 314. The measurement data specifies the client IP address and the unique ID.

As discussed above, the measurement engine 312 processes the received measurement data to compute a latency associated with processing the API call. Further, the measurement engine 312 determines that the latency is associated with the resolver ID by matching the unique ID logged in association with the resolver IP address and the unique ID specified by the logged measurement data. In such a manner, even though the measurement data does not include the client IP address, the latency determined based on measurement data specifying the client IP address can be associated with the resolver IP address.

Returning to FIG. 3, for a given API call, the client steering system 308 steers the client 304 to one of the API edge gateways 302 (i.e., one of the embedded acceleration systems 320, one of the IX acceleration systems 322, or the API processing system 102) for the processing of the API call. To perform this steering function, the client steering system includes a selection engine 316 and a gateway map 318 received from the measurement system 306.

The selection engine 316 receives steering requests from the client 304 for the processing of API calls. For ease of discussion, the following describes how the selection engine 316 processes a given steering request that is received from the client 304 and is associated with a given API call. In one embodiment, the steering request includes an Internet protocol (IP) address associated with the client device. In an alternative embodiment, the steering request includes an IP address of a resolver of an ISP through which the client device accesses the Internet.

In response to a steering request from the client 304, the selection engine 316 selects one of the API edge gateways 302 for processing the API call. In particular, the selection engine 316 routes the client 304 to one of the embedded acceleration systems 320, one of the IX acceleration systems 322, or the API processing system 102. The selection engine 316 utilizes the gateway map 318 to identify a suitable acceleration system from the embedded acceleration systems 320 and the IX acceleration systems 322 for processing the API call. In particular, the selection engine 316 matches the IP address included in the steering request with an IP address in a key-gateway pair in the gateway map 318. The selection engine 316 then selects the gateway identified in the key-gateway pair as the API edge gateway 302 to which the client 304 is steered. In one embodiment, if no suitable acceleration system can be identified based on the selection criteria, then the selection engine 316 routes the client 304 directly to the API processing system 102 for processing the API call.

In one embodiment, in addition to the gateway map, the selection engine 316 monitors each of the embedded acceleration systems 320 and the IX acceleration systems 322 to determine a current load on the acceleration system. The selection engine 316 monitors different aspects of an acceleration system 320 or 322 to determine its current load. These aspects include, without limitation, a number of active sessions with clients and a number of API calls that are being facilitated with the API processing system. Further, the selection engine 316 may also monitor the amount of processing resources of the acceleration system 320 or 322 that are being utilized, the amount of memory resources of the acceleration system 320 or 322 that are being utilized, and a level of congestion on the communication channel between the acceleration system 320 or 322 and the API processing system 102.

As discussed above, each of the acceleration systems 316 and 318 operates as an intermediary between many different clients and the API processing system 102. Therefore, the load on an acceleration system 320 or 322 varies depending on the number of API calls that the acceleration system is facilitating at any given time. When the determined the load on an acceleration system 320 or 322 exceeds a certain threshold, the selection engine 316 may defer the selection of the acceleration system for facilitating the processing of any further API calls until the load falls below the threshold.

Figure 5:
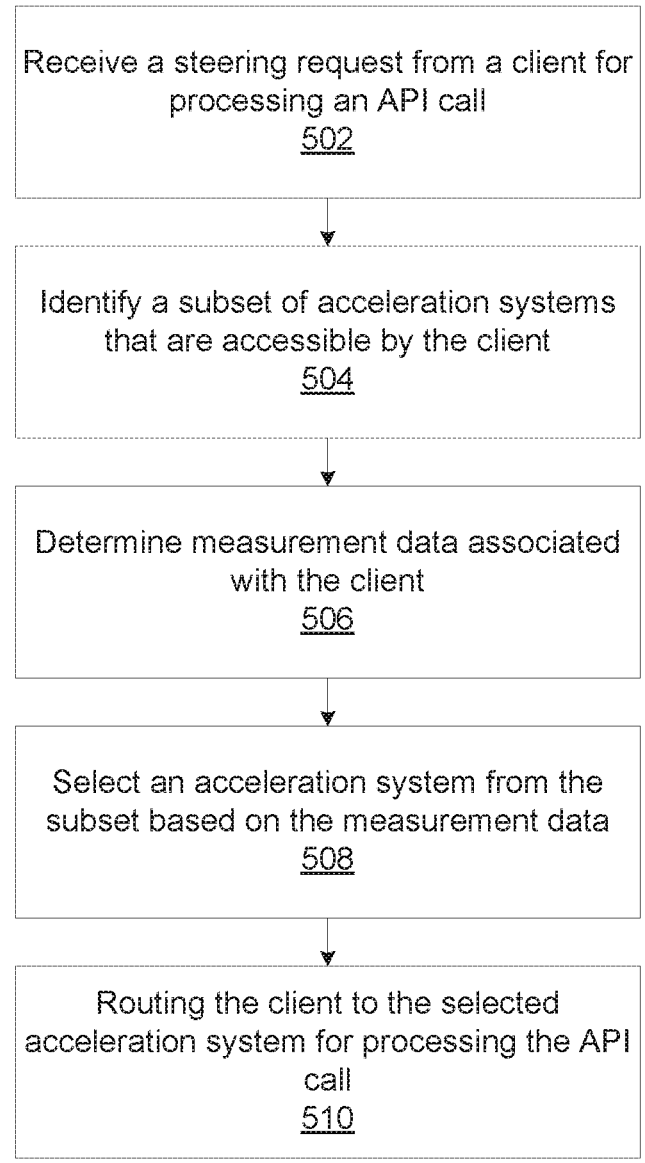
FIG. 5 is a flow diagram of method steps for steering a client to an API access endpoint, according to another embodiment of the invention.

FIG. 5 is a flow diagram of method steps for steering a client to an API edge gateway, according to another embodiment of the invention. Although the method steps are described in conjunction with the systems for FIGS. 1 and 3, persons skilled in the art will understand that any system configured to perform the method steps, in any order, is within the scope of the invention.

The method 500 begins at step 502, where the client steering system 308 receives a steering request from the client 304 for processing an API call. The steering request includes an Internet protocol address associated with the client or a resolver associated with an ISP through which the client accesses the Internet. 320 or 322320 or 322.

At step 504, the steering system 308 identifies a subset of the acceleration systems that are accessible by the client. As discussed above, in some cases, certain acceleration systems are accessible to only those clients that are able to access the ISP or the Internet exchange point within which the acceleration systems are embedded. Since the client 304 being able to access the acceleration system is a necessary aspect of the acceleration system operating as an intermediary between the client 304 and the API processing system 102, the steering system 308 selects only those acceleration systems that are accessible by the client 304.

At step 506, the steering system 308 determines measurement data associated with the client 304 based on the gateway map received from the measurement system 306. The measurement data represents API call roundtrip times for previous API calls made by the client or one or more other clients that are to be steered together with the given client. At step 508, the steering system 308 selects an acceleration system from the subset identified at step 506 based on the measurement data. The steering system 308 selects an acceleration system based on previously measured latency.

At step 510, the steering system 308 routes the client 304 to the selected acceleration system for processing the API call. In response, the client 304 transmits a request for processing the API call to the selected acceleration system, and the acceleration system facilitates the processing of the API call with the API processing system 102.

In sum, acceleration systems operate as intermediaries between the API processing system and the clients to reduce the API call roundtrip latencies. The acceleration systems include a network of interconnected systems that are distributed across the globe and each operates as an intermediary between the clients and the API processing system. A given client establishes a network connection with a given acceleration system and transmits a request for processing an API call over the connection. The programming function associated with the API call is configured in the API processing system. The acceleration system facilitates the processing of the API call over a previously established connection with the API processing system.

Advantageously, the round trip time for processing the API call is reduced when the acceleration system operates as the intermediary between the client device and the API processing system. In particular, any round trip times needed to establish the communication connection between the client device and the acceleration system are shorter relative to if the connection needed to be established between the client device and the API processing system.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A method, comprising:
receiving, from a client device, a steering request associated with an application programming interface (API) call; and
in response to receiving the steering request,
selecting, based on reachability selection criteria, an acceleration system that operates as an intermediary between the client device and an API processing system while enabling the API call to be processed, wherein the reachability selection criteria specify that the client device be able to access at least one of an Internet service provider or an Internet exchange point associated with the acceleration system, and wherein Internet service providers and content delivery networks are able to exchange Internet traffic though the Internet exchange point, and
routing the client device to the acceleration system.

2. The method of claim 1, wherein selecting the acceleration system based on the reachability selection criteria comprises determining that the acceleration system is accessible by the client device.

3. The method of claim 2, wherein the acceleration system is embedded within the Internet service provider and is accessible only by client devices that are associated with the Internet service provider.

4. The method of claim 1, wherein the acceleration system also enabled a previous API call to be processed, and selecting the acceleration system is further based on a latency associated with processing the previous API call.

5. The method of claim 1, further comprising:
receiving measurement data that is associated with processing a second API call and specifies a unique identifier associated with the client device;
computing, based on the measurement data, a latency that represents a total time from when a connection between the client device and the acceleration system was initiated to when a response associated with the second API call was received by the client device;
receiving from a resolver a request including a resolver Internet Protocol (IP) address and the unique identifier; and
matching the unique identifier included in the request with the unique identifier specified by the measurement data to determine that the latency is associated with the resolver IP address.

6. The method of claim 5, further comprising:
receiving, from the client device, a second steering request associated with a third API call, wherein the second steering request includes the resolver IP address; and
selecting, based on the latency that is associated with the resolver IP address, the acceleration system that operates as the intermediary between the client device and the API processing system while enabling the third API call to be processed.

7. The method of claim 6, wherein the resolver IP address is associated with the Internet service provider through which the client device accesses Internet services, and wherein the resolver IP address is different than a client IP address associated with the client device.

8. The method of claim 1, wherein selecting the acceleration system is further based on a level of congestion within a communication connection between the acceleration system and the API processing system.

9. The method of claim 1, further comprising receiving, from the client device, measurement data from the client device generated from one or more measurement operations associated with the acceleration system.

10. One or more non-transitory computer readable media storing instructions that, when executed by one or more processors, cause the one or more processors to:
receive, from a client device, a steering request associated with an application programming interface (API) call; and
in response to receiving the steering request,
select, based on reachability selection criteria, an acceleration system that operates as an intermediary between the client device and an API processing system while enabling the API call to be processed, wherein the reachability selection criteria specify that the client device be able to access at least one of an Internet service provider or an Internet exchange point associated with the acceleration system, and wherein Internet service providers and content delivery networks are able to exchange Internet traffic though the Internet exchange point, and route the client device to the acceleration system.

11. The one or more computer readable media of claim 10, wherein the instructions, when executed by the one or more processors, further cause the one or more processors to select the acceleration system based on the reachability selection criteria by determining that the acceleration system is accessible by the client device.

12. The one or more computer readable media of claim 11, wherein the acceleration system is embedded within the Internet service provider and is accessible only by client devices that are associated with the internet service provider.

13. The one or more computer readable media of claim 10, wherein the acceleration system is embedded within the Internet exchange point and is accessible only by client devices that can be routed to the Internet exchange point.

14. The one or more computer readable media of claim 10, wherein the instructions, when executed by the one or more processors, further cause the one or more processors to:

receive measurement data that is associated with processing a second API call and specifies a unique identifier associated with the client device;

compute, based on the measurement data, a latency that represents a total time from when a connection between the client device and the acceleration system was initiated to when a response associated with the second API call was received by the client device;

receive from a resolver a request including a resolver Internet Protocol (IP) address and the unique identifier; and match the unique identifier included in the request with the unique identifier specified by the measurement data to determine that the latency is associated with the resolver IP address.

15. The one or more computer readable media of claim 14, wherein the instructions, when executed by the one or more processors, further cause the one or more processors to:

receive, from the client device, a second steering request associated with a third API call, wherein the second steering request includes the resolver IP address; and select, based on the latency that is associated with the resolver IP address, the acceleration system that operates as the intermediary between the client device and the API processing system while enabling the third API call to be processed.

16. The one or more computer readable media of claim 10, wherein the instructions, when executed by the one or more processors, further cause the one or more processors to select the acceleration system based on latency criteria.

17. The one or more computer readable media of claim 16, wherein the instructions, when executed by the one or more processors, further cause the one or more processors to select the acceleration system based on the latency criteria by determining latencies associated with one or more prior API calls received from the client device and processed by the acceleration system.

18. The one or more computer readable media of claim 17, wherein the instructions, when executed by the one or more processors, further cause the one or more processors to process measurement data received from the client device to measure the latencies.

19. A computing environment, comprising:

a plurality of acceleration systems that each operates as an intermediary between a client device and an API processing system while enabling application programming interface (API) calls to be processed; and a client steering system configured to route the client device to one of the plurality of acceleration systems using reachability selection criteria, wherein the client steering system comprises a selection engine configured to:

receive, from the client device, a steering request associated with an API call, and in response to receiving the steering request, select, based on the reachability selection criteria, an acceleration system from the plurality of acceleration systems for enabling the API call to be processed, wherein the reachability selection criteria specify that the client device be able to access at least one of an Internet service provider or an Internet exchange point associated with the selected acceleration system, and wherein Internet service providers and content delivery networks are able to exchange Internet traffic though the Internet exchange point; and route the client device to the selected acceleration system.

20. The computing environment of claim 19, wherein, in response to being routed to the selected acceleration system, the client device performs a transmission control protocol (TCP) handshake and a transport layer security (TLS) handshake with the selected acceleration system.

21. The computing environment of claim 20, wherein, subsequent to the TCP and TLS handshakes, the client device transmits the API call to the selected acceleration system, and the selected acceleration system forwards the API call to the API processing system.

* * * * *